US012763082B2

(12) United States Patent
Pihlajakuja et al.

(10) Patent No.: US 12,763,082 B2
(45) Date of Patent: Oct. 13, 2026

(54) QUANTIZING SPATIAL AUDIO PARAMETERS

(71) Applicant: Nokia Technologies Oy, Espoo (FI)

(72) Inventors: Tapani Pihlajakuja, Kellokoski (FI); Adriana Vasilache, Tampere (FI); Mikko-Ville Laitinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 214 days.

(21) Appl. No.: 18/044,666

(22) PCT Filed: Aug. 19, 2021

(86) PCT No.: PCT/FI2021/050557

§ 371 (c)(1),
(2) Date: Mar. 9, 2023

(87) PCT Pub. No.: WO2022/053738

PCT Pub. Date: Mar. 17, 2022

(65) Prior Publication Data

US 2023/0335143 A1 Oct. 19, 2023

(30) Foreign Application Priority Data

Sep. 14, 2020 (GB) ...................................... 2014392

(51) Int. Cl.
*G10L 19/008* (2013.01)
*H04S 7/00* (2006.01)

(52) U.S. Cl.
CPC ............ *G10L 19/008* (2013.01); *H04S 7/305* (2013.01)

(58) Field of Classification Search
None
See application file for complete search history.

(56) References Cited

U.S. PATENT DOCUMENTS 10,477,311 B2 * 11/2019 Vilkamo .................. H04R 5/04
10,524,072 B2 * 12/2019 Habets .................. G10L 19/008
(Continued)

FOREIGN PATENT DOCUMENTS

CN 111316354 A 6/2020
CN 111656442 A 9/2020
(Continued)

OTHER PUBLICATIONS

"Description of the IVAS MASA C Reference Software", 3GPP TSG-SA4#106 meeting, S4 (19)1167, Agenda Item: 7.5, Nokia Corporation, Oct. 21-25, 2019, pp. 1-16.
(Continued)

*Primary Examiner* — Daniel C Washburn
(74) *Attorney, Agent, or Firm* — ALSTON & BIRD LLP

(57) ABSTRACT

There is inter alia disclosed an apparatus for spatial audio encoding configured to convert two or more energy ratios associated with a time frequency tile of one or more audio signals to a further energy ratio parameter which is related to the two or more energy ratios; quantize the further energy ratio parameter using a first quantizer; determine a distribution factor of energy ratios dependent on a ratio of a first of the two or more energy ratios to the sum of the two or more energy ratios; select a further quantizer from a plurality of further quantizers using the quantized further energy ratio parameter; and quantize the distribution factor of energy ratios using the selected further quantizer.

14 Claims, 4 Drawing Sheets

(56) References Cited

U.S. PATENT DOCUMENTS

| | | | | |
|---|---|---|---|---|
| 11,317,231 | B2 * | 4/2022 | Vilkamo | H04S 3/00 |
| 11,367,454 | B2 * | 6/2022 | Fuchs | G10L 19/008 |
| 11,765,536 | B2 * | 9/2023 | Bruhn | H04S 3/02 381/22 |
| 11,783,843 | B2 * | 10/2023 | Fuchs | H03M 7/6011 704/500 |
| 12,067,991 | B2 * | 8/2024 | Fuchs | H04R 1/32 |
| 12,075,210 | B2 * | 8/2024 | Lepoutre | G01S 3/805 |
| 12,183,360 | B2 * | 12/2024 | Herre | G10L 19/173 |
| 2007/0016416 | A1 | 1/2007 | Roden et al. | |
| 2010/0063812 | A1 | 3/2010 | Gao | |
| 2010/0322429 | A1 | 12/2010 | Norvell et al. | |
| 2017/0076739 | A1 * | 3/2017 | Xu | G10L 25/21 |
| 2019/0158833 | A1 * | 5/2019 | Sung | G10L 19/167 |
| 2020/0265851 | A1 | 8/2020 | Fuchs et al. | |
| 2020/0273473 | A1 | 8/2020 | Fuchs et al. | |
| 2021/0377685 | A1 | 12/2021 | Laitinen et al. | |
| 2022/0108705 | A1 * | 4/2022 | Fuchs | G10L 19/005 |
| 2023/0306975 | A1 * | 9/2023 | Fuchs | G10L 25/78 |

FOREIGN PATENT DOCUMENTS

| | | | | |
|---|---|---|---|---|
| GB | 2572650 | A | 10/2019 | |
| GB | 2572761 | A | 10/2019 | |
| GB | 2575305 | A | 1/2020 | |
| WO | 2017/005978 | A1 | 1/2017 | |
| WO | 2018/091776 | A1 | 5/2018 | |
| WO | 2019/086757 | A1 | 5/2019 | |
| WO | WO-2019170955 | A1 * | 9/2019 | G10L 21/028 |
| WO | 2019/234290 | A1 | 12/2019 | |
| WO | 2020/008105 | A1 | 1/2020 | |
| WO | 2020/070377 | A1 | 4/2020 | |
| WO | WO-2020089510 | A1 * | 5/2020 | G10L 19/008 |
| WO | 2020/193865 | A1 | 10/2020 | |
| WO | 2021/048468 | A1 | 3/2021 | |
| WO | 2021/250311 | A1 | 12/2021 | |

OTHER PUBLICATIONS

"Proposal for MASA common metadata and metadata structure", 3GPP TSG-SA4#101 meeting, S4 (18)1353, Agenda Item: 7.5, Nokia Corporation, Nov. 19-23, 2018, pp. 1-4.

Search Report received for corresponding United Kingdom Patent Application No. 2014392.1, dated Mar. 1, 2021, 3 pages.

International Search Report and Written Opinion received for corresponding Patent Cooperation Treaty Application No. PCT/FI2021/050557, dated Nov. 23, 2021, 14 pages.

Extended European Search Report received for corresponding European Patent Application No. 21866147.8, dated Jul. 1, 18, 2024, 5 pages.

Office action received for corresponding Indian Patent Application No. 202317024747, dated Dec. 10, 2024, 7 pages.

Notice of Allowance for Vietnamese Application No. 1-2023-02401 dated Apr. 23, 2026, 2 pages.

Notice of Grant for Chinese Application No. 202180076948.3 dated Apr. 22, 2026, 7 pages.

Office Action for Korean Application No. 10-2023-7012556 dated Mar. 13, 2026, 7 pages.

Office Action for Chinese Application No. 202180076948.3 dated Dec. 2, 2025, 14 pages.

Office Action for Vietnamese Application No. 1-2023-02401 dated Aug. 18, 2025, 4 pages.

* cited by examiner

QUANTIZING SPATIAL AUDIO PARAMETERS

RELATED APPLICATION

This application claims priority to PCT Application No. PCT/FI2021/050557, filed on Aug. 19, 2021, which claims priority to GB Application No. 2014392.1, filed on Sep. 14, 2020, each of which is incorporated herein by reference in its entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as surround coherence, spread coherence, number of directions, distance, etc.) for an audio codec. For example, these parameters can be estimated from microphone-array captured audio signals, and for example a stereo or mono signal can be generated from the microphone array signals to be conveyed with the spatial metadata. The stereo signal could be encoded, for example, with an AAC encoder and the mono signal could be encoded with an EVS encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field. Furthermore, the analysis of higher-order Ambisonics (HOA) input for multi-direction spatial metadata extraction has also been documented in the scientific literature related to higher-order directional audio coding (HO-DirAC).

A further input for the encoder is also multi-channel loudspeaker input, such as 5.1 or 7.1 channel surround inputs and audio objects.

However, with respect to the components of the spatial metadata the compression and encoding of the spatial audio parameters (such as the direct-to-total energy ratios) is of considerable interest in order to minimise the overall number of bits required to represent the spatial audio parameters.

SUMMARY

There is according to a first aspect an apparatus for spatial audio encoding comprising means for: converting two or more energy ratios associated with a time frequency tile of one or more audio signals to a further energy ratio parameter which is related to the two or more energy ratios; quantizing the further energy ratio parameter using a first quantizer; determining a distribution factor of energy ratios dependent on a ratio of a first of the two or more energy ratios to the sum of the two or more energy ratios; selecting a further quantizer from a plurality of further quantizers using the quantized further energy ratio parameter; and quantizing the distribution factor of energy ratios using the selected further quantizer.

The two or more energy ratios may be two direct-to-total energy ratios;

The further energy ratio parameter may be a diffuse-to-total energy ratio.

The diffuse-to-total energy ratio may comprise one minus the sum of the two direct-to-total energy ratios.

The further energy ratio parameter may be the sum of the two direct-to-total energy ratios.

The distribution factor of energy ratios may comprise the ratio of a first of the two direct-to-total energy ratios to the sum of the two direct-to-total energy ratios.

The means for selecting a further quantizer from a plurality of further quantizers using the quantized further energy ratio parameter may comprise means for: comparing the quantized further energy ratio parameter to a threshold value; and selecting the further quantizer from a plurality of further quantizers based on the comparison.

A first of the two direct-to-total energy ratios may be associated with a first direction of a sound wave and a second of the two direct-to-total energy ratio may be associated with a second direction of a sound wave, wherein the apparatus may further comprise proceeding means for: determining that a second of the two direct-to-total energy ratios is greater than a first of the two direct-to-total energy ratios; swapping the first of the two direct-to-total energy ratios to be associated with the second direction; and swapping the second of the two direct-to-total energy ratios to be associated with the first direction.

A first direction index, a first spread coherence and a first distance associated with the time frequency tile may each be associated with a first direction of the sound wave, and a second direction index, a second spread coherence and a second distance associated with the time frequency tile may each be associated with the second direction of the sound wave, if is determined that the second of the two direct-to-total energy ratios is greater than the first of the two direct-to-total energy ratios, the apparatus may further comprise the means for at least one of the following: swapping the first direction index to be associated with the second direction and swapping the second direction index to be associated with the first direction; swapping the first distance to be associated with the second direction and swapping the second distance to be associated with the first direction; and swapping the first spread coherence to be associated with the second direction and swapping the second spread coherence to be associated with the first direction.

There is according to a second aspect a method for spatial audio encoding comprising: converting two or more energy ratios associated with a time frequency tile of one or more audio signals to a further energy ratio parameter which is related to the two or more energy ratios; quantizing the further energy ratio parameter using a first quantizer; determining a distribution factor of energy ratios dependent on a ratio of a first of the two or more energy ratios to the sum of the two or more energy ratios; selecting a further quantizer from a plurality of further quantizers using the quantized further energy ratio parameter; and quantizing the distribution factor of energy ratios using the selected further quantizer.

The two or more energy ratios may be two direct-to-total energy ratios;

The further energy ratio parameter may be a diffuse-to-total energy ratio.

The diffuse-to-total energy ratio may comprise one minus the sum of the two direct-to-total energy ratios.

The further energy ratio parameter may be the sum of the two direct-to-total energy ratios.

The distribution factor of energy ratios may comprise the ratio of a first of the two direct-to-total energy ratios to the sum of the two direct-to-total energy ratios.

Selecting a further quantizer from a plurality of further quantizers using the quantized further energy ratio parameter may comprise comparing the quantized further energy ratio parameter to a threshold value; and selecting the further quantizer from a plurality of further quantizers based on the comparison.

A first of the two direct-to-total energy ratios may be associated with a first direction of a sound wave and a second of the two direct-to-total energy ratio may be associated with a second direction of a sound wave, wherein the method further comprises the preceding processing steps of: determining that a second of the two direct-to-total energy ratios is greater than a first of the two direct-to-total energy ratios; swapping the first of the two direct-to-total energy ratios to be associated with the second direction; and swapping the second of the two direct-to-total energy ratios to be associated with the first direction.

A first direction index, a first spread coherence and a first distance associated with the time frequency tile may also be each associated with a first direction of the sound wave, and wherein a second direction index, a second spread coherence and a second distance associated with the time frequency tile may also each be associated with the second direction of the sound wave, wherein if is determined that the second of the two direct-to-total energy ratios is greater than the first of the two direct-to-total energy ratios, the method may further comprise at least one of the following: swapping the first direction index to be associated with the second direction and swapping the second direction index to be associated with the first direction; swapping the first distance to be associated with the second direction and swapping the second distance to be associated with the first direction; and swapping the first spread coherence to be associated with the second direction and swapping the second spread coherence to be associated with the first direction.

According to a third aspect there is an apparatus for spatial audio encoding comprising at least one processor and at least one memory including computer program code, the at least one memory and the computer program code configured to, with the at least one processor, cause the apparatus to at least to perform converting two or more energy ratios associated with a time frequency tile of one or more audio signals to a further energy ratio parameter which is related to the two or more energy ratios; quantizing the further energy ratio parameter using a first quantizer; determining a distribution factor of energy ratios dependent on a ratio of a first of the two or more energy ratios to the sum of the two or more energy ratios; selecting a further quantizer from a plurality of further quantizers using the quantized further energy ratio parameter; and quantizing the distribution factor of energy ratios using the selected further quantizer.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
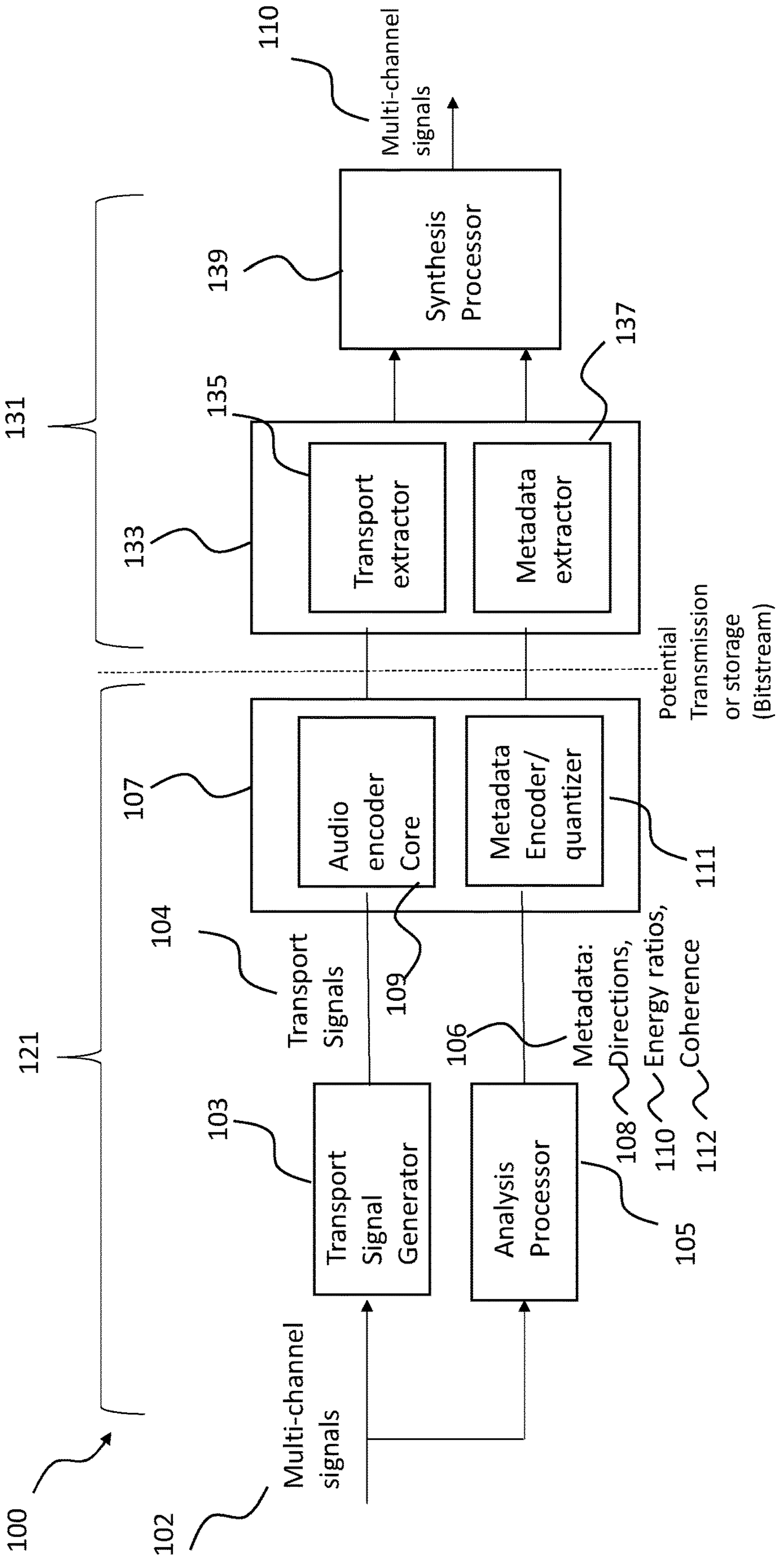
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA), etc. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals. Such a system is currently being standardised by the 3GPP standardization body as the Immersive Voice and Audio Service (IVAS). IVAS is intended to be an extension to the existing 3GPP Enhanced Voice Service (EVS) codec in order to facilitate immersive voice and audio services over existing and future mobile (cellular) and fixed line networks. An application of IVAS may be the provision of immersive voice and audio services over 3GPP fourth generation (4G) and fifth generation (5G) networks. In addition, the IVAS codec as an extension to EVS may be used in store and forward applications in which the audio and speech content is encoded and stored in a file for playback. It is to be appreciated that IVAS may be used in conjunction with other audio and speech coding technologies which have the functionality of coding the samples of audio and speech signals.

The metadata may consist of at least of spherical directions (elevation, azimuth), at least one energy ratio of a resulting direction, a spread coherence, and surround coherence independent of the direction, for each considered time-frequency (TF) block or tile, in other words a time/frequency sub band. In total IVAS may have a number of different types of metadata parameters for each time-frequency (TF) tile.

The types of spatial audio parameters which can make up the metadata for IVAS are shown in Table 1 below.

This data may be encoded and transmitted (or stored) by the encoder in order to be able to reconstruct the spatial signal at the decoder.

Moreover, in some instances metadata assisted spatial audio (MASA) may support up to 2 directions for each TF tile which would require the above parameters to be encoded and transmitted for each direction on a per TF tile basis. Thereby potentially doubling the required bit rate according to Table 1 below.

| Field | Bits | Description |
|---|---|---|
| Direction index | 16 | Direction of arrival of the sound at a time-frequency parameter interval. Spherical representation at about 1-degree accuracy. Range of values: "covers all directions at about 1° accuracy" |
| Direct-to-total energy ratio | 8 | Energy ratio for the direction index (i.e., time-frequency subframe). Calculated as energy in direction/total energy. Range of values: [0.0, 1.0] |
| Spread coherence | 8 | Spread of energy for the direction index (i.e., time-frequency subframe). Defines the direction to be reproduced as a point source or coherently around the direction. Range of values: [0.0, 1.0] |
| Diffuse-to-total energy ratio | 8 | Energy ratio of non-directional sound over surrounding directions. Calculated as energy of non-directional sound/total energy. Range of values: [0.0, 1.0] (Parameter is independent of number of directions provided.) |
| Surround coherence | 8 | Coherence of the non-directional sound over the surrounding directions. Range of values: [0.0, 1.0] (Parameter is independent of number of directions provided.) |
| Remainder-to-total energy ratio | 8 | Energy ratio of the remainder (such as microphone noise) sound energy to fulfil requirement that sum of energy ratios is 1. Calculated as energy of remainder sound/total energy. Range of values: [0.0, 1.0] (Parameter is independent of number of directions provided.) |
| Distance | 8 | Distance of the sound originating from the direction index (i.e., time-frequency subframes) in meters on a logarithmic scale. Range of values: for example, 0 to 100 m. (Feature intended mainly for future extensions, e.g., 6DoF audio.) |

This data may be encoded and transmitted (or stored) by the encoder in order to be able to reconstruct the spatial signal at the decoder.

The bitrate allocated for metadata in a practical immersive audio communications codec may vary greatly. Typical overall operating bitrates of the codec may leave only 2 to 10 kbps for the transmission/storage of spatial metadata. However, some further implementations may allow up to 30 kbps or higher for the transmission/storage of spatial metadata. The encoding of the direction parameters and energy ratio components has been examined before along with the encoding of the coherence data. However, whatever the transmission/storage bit rate assigned for spatial metadata there will always be a need to use as few bits as possible to represent these parameters especially when a TF tile may support multiple directions corresponding to different sound sources in the spatial audio scene.

The concept as discussed hereafter is to quantize, the direct-to-total energy ratio for all directions in the form of the diffuse-to-total energy ratio for the TF tile and a ratio based on the direct-to-total energy ratios.

Accordingly, the invention proceeds from the consideration that the bit rate required for transmitting the MASA data (or spatial metadata spatial audio parameters) may be reduced by quantizing, on a TF tile basis, the direct-to-total energy ratio corresponding to each direction by using as few bits as possible in order to facilitate transmission and storage of the encoded audio signal.

In this regard, FIG. 1 depicts an example apparatus and system for implementing embodiments of the application. The system 100 is shown with an 'analysis' part 121 and a 'synthesis' part 131. The 'analysis' part 121 is the part from receiving the multi-channel signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial metadata associated with the audio signals may be provided to an encoder as a separate bit-stream. In some embodiments the spatial metadata may be provided as a set of spatial (direction) index values. These are examples of a metadata-based audio input format.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example, the transport signal generator 103 may be configured to generate a 2-audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104.

The analysis processor 105 may be configured to generate the metadata which may comprise, for each time-frequency analysis interval, direction parameters 108 and energy ratio parameters 110 (comprising a direct-to-total energy ratio per direction and a diffuse-to-total energy ratio) and a coherence parameter 112. The direction, energy ratio and coherence parameters may in some embodiments be considered to be spatial audio parameters. In other words, the spatial audio parameters comprise parameters which aim to characterize the sound-field created/captured by the multi-channel signals (or two or more audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an encoder 107.

The encoder 107 may comprise an audio encoder core 109 which is configured to receive the transport (for example downmix) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a transport extractor 135 which is configured to decode the audio signals to obtain the transport signals. Similarly, the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the metadata.

Therefore, in summary first the system (analysis part) is configured to receive multi-channel audio signals.

Then the system (analysis part) is configured to generate a suitable transport audio signal (for example by selecting or downmixing some of the audio signal channels) and the spatial audio parameters as metadata.

The system is then configured to encode for storage/transmission the transport signal and the metadata.

After this the system may store/transmit the encoded transport signal and metadata.

The system may retrieve/receive the encoded transport signal and metadata.

Then the system is configured to extract the transport signal and metadata from encoded transport signal and metadata parameters, for example demultiplex and decode the encoded transport signal and metadata parameters.

The system (synthesis part) is configured to synthesize an output multi-channel audio signal based on extracted transport audio signals and metadata.

Figure 2:
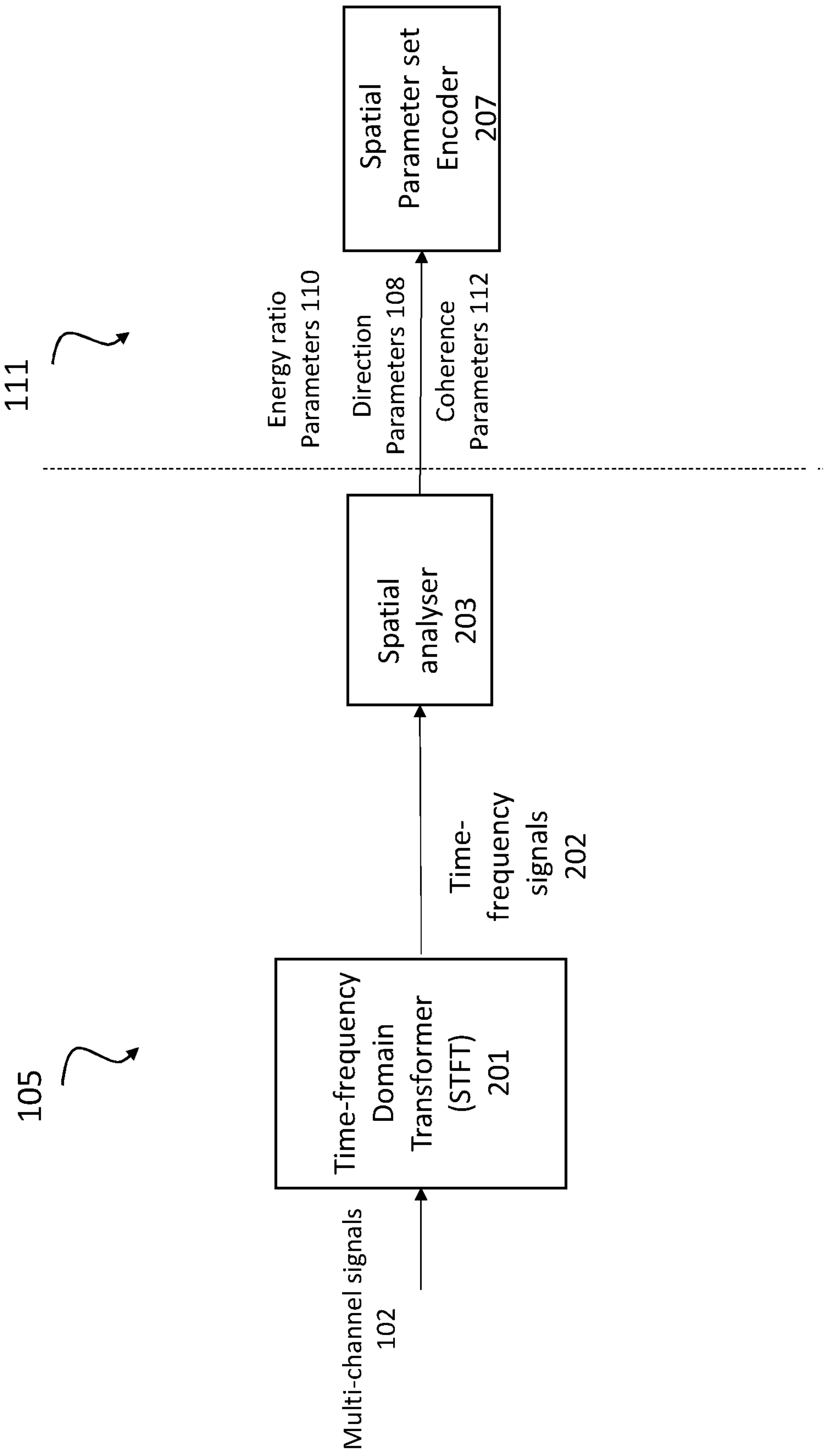
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

FIGS. 1 and 2 depict the Metadata encoder/quantizer 111 and the analysis processor 105 as being coupled together. However, it is to be appreciated that some embodiments may not so tightly couple these two respective processing entities such that the analysis processor 105 can exist on a different device from the Metadata encoder/quantizer 111. Consequently, a device comprising the Metadata encoder/quantizer 111 may be presented with the transport signals and metadata streams for processing and encoding independently from the process of capturing and analysing.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus, for example, the time-frequency signals 202 may be represented in the time-frequency domain representation by $$s_i(b, n),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index k=0, . . . , K−1. Each sub band k has a lowest bin $b_{k,low}$ and a highest bin $b_{k,high}$, and the subband contains all bins from $b_{k,low}$ to $b_{k,high}$. The widths of the sub bands can approximate any suitable distribution. For example, the Equivalent rectangular bandwidth (ERB) scale or the Bark scale.

A time frequency (TF) tile (or block) is thus a specific sub band within a subframe of the frame.

It can be appreciated that the number of bits required to represent the spatial audio parameters may be dependent at least in part on the TF (time-frequency) tile resolution (i.e., the number of TF subframes or tiles). For example, a 20 ms audio frame may be divided into 4 time-domain subframes of 5 ms a piece, and each time-domain subframe may have up to 24 frequency subbands divided in the frequency domain according to a Bark scale, an approximation of it, or any other suitable division. In this particular example the audio frame may be divided into 96 TF subframes/tiles, in other words 4 time-domain subframes with 24 frequency subbands. Therefore, the number of bits required to represent the spatial audio parameters for an audio frame can be dependent on the TF tile resolution. For example, if each TF tile were to be encoded according to the distribution of Table 1 above then each TF tile would require 64 bits (for one sound source direction per TF tile) and 104 bits (for two sound source directions per TF tile, taking into account parameters which are independent of the sound source direction).

In embodiments the analysis processor 105 may comprise a spatial analyser 203. The spatial analyser 203 may be configured to receive the time-frequency signals 202 and based on these signals estimate direction parameters 108. The direction parameters may be determined based on any audio based 'direction' determination.

For example, in some embodiments the spatial analyser 203 is configured to estimate the direction of a sound source with two or more signal inputs.

The spatial analyser 203 may thus be configured to provide at least one azimuth and elevation for each frequency band and temporal time-frequency block within a frame of an audio signal, denoted as azimuth $\phi(k, n)$, and elevation $\theta(k, n)$. The direction parameters 108 for the time sub frame may be also be passed to the spatial parameter set encoder 207.

The spatial analyser 203 may also be configured to determine an energy ratio parameters 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter. Each direct-to-total energy ratio corresponds to a specific spatial direction and describes how much of the energy comes from the specific spatial direction compared to the total energy. This value may also be represented for each time-frequency tile separately. The spatial direction parameters and direct-to-total energy ratio describe how much of the total energy for each time-frequency tile is coming from the specific direction. In general, a spatial direction parameter can also be thought of as the direction of arrival (DOA).

In embodiments the direct-to-total energy ratio parameter can be estimated based on the normalized cross-correlation parameter cor'(k, n) between a microphone pair at band k, the value of the cross-correlation parameter lies between −1 and 1. The direct-to-total energy ratio parameter r(k, n) can be determined by comparing the normalized cross-correlation parameter to a diffuse field normalized cross correlation parameter $$cor'_D(k, n) \text{ as } r(k, n) = \frac{cor'(k, n) - cor'_D(k, n)}{1 - cor'_D(k, n)}.$$

The direct-to-total energy ratio is explained further in PCT publication WO2017/005978 which is incorporated herein by reference. The energy ratio may be passed to the spatial parameter set encoder 207.

The spatial analyser 203 may furthermore be configured to determine a number of coherence parameters 112 which may include surrounding coherence ($\gamma(k, n)$) and spread coherence ($\zeta(k, n)$), both analysed in time-frequency domain.

The term audio source may relate to dominant directions of the propagating sound wave, which may encompass the actual direction of the sound source.

Therefore, for each sub band k there will be collection (or set) of spatial audio parameters associated with the sub band and sub frame n. In this instance each sub band k and sub frame n (in other words a TF tile) may have the following spatial audio parameters associated with it on a per audio source direction basis; at least one azimuth and elevation denoted as azimuth $\phi$ (k, n), and elevation $\theta(k, n)$, and a spread coherence ($\zeta(k, n)$ and a direct-to-total-energy ratio parameter r(k,n). Obviously if there is more than one direction per TF tile, then the TF tile can have each of the above listed parameters associated with each sound source direction. Additionally, the collection of spatial audio parameters may also comprise a surrounding coherence ($\gamma(k, n)$). Parameters may also comprise a diffuse-to-total energy ratio $r_{diff}$ (k, n).

In embodiments the diffuse-to-total energy ratio $r_{diff}$ (k, n) is the energy ratio of non-directional sound over surrounding directions and there is typically a single diffuse-to-total energy ratio (as well as surrounding coherence ($\gamma(k, n)$)) per TF tile. The diffuse-to-total energy ratio may be considered to be the energy ratio remaining once the direct-to-total energy ratios (for each direction) have been subtracted from one. Going forward, the above parameters may be termed a set of spatial audio parameters (or a spatial audio parameter set) for a particular TF tile.

In embodiments the spatial parameter set encoder 207 can be arranged to quantize the energy ratio parameters 110 in addition to the direction parameters 108 and coherence parameters 112. The energy ratio parameters 110 comprising direct-to-total-energy ratio parameters r(k, n) for each direction may be quantised based on the diffuse-to-total energy ratio $r_{diff}$ (k, n) and a further parameter. The further parameter may comprise a ratio of one of the direct-to-total-energy ratio parameters to the sum of the direct-to-total energy ratios for all directions, the further parameter may be termed dr(k, n).

In some alternative embodiments, sum of direct-to-total energy ratios may be quantized instead of diffuse-to-total energy ratio $r_{diff}$ (k, n), where the sum of direct-to-total energy ratios may be expressed as:

$$r_{sum}(k, n) = \sum_d r_d(k, n)$$

For TF tiles which have two audio source directions assigned to them, the direct-to-total-energy ratio parameter of the first direction $r_1$ (k, n) and the direct-to-total-energy ratio parameter of the second direction $r_2$ (k, n) for the TF tile (k, n) can be quantized in the form of the diffuse-to-total energy ratio $r_{diff}$ (k, n) and dr(k, n) for the TF tile.

In embodiments the first direct-to-total-energy ratio parameter $r_1$ (k,n) and the second direct-to-total-energy ratio parameter $r_2$ (k,n) may be quantized by determining the diffuse-to-total energy ratio $r_{diff}$ (k, n) as $$r_{diff}(k, n) = 1 - (r_1(k, n) + r2(k, n))$$

In some alternative embodiments the diffuse-to-total energy ratio $r_{diff}$ (k, n) may be provided as part of the MASA input metadata, rather than being calculated on the fly as outlined above. In this case the spatial parameter set encoder 207 may obtain a further energy ratio parameter (or diffuse-to-total energy ratio) associated with two or more energy ratios of a time frequency tile.

Figure 3:
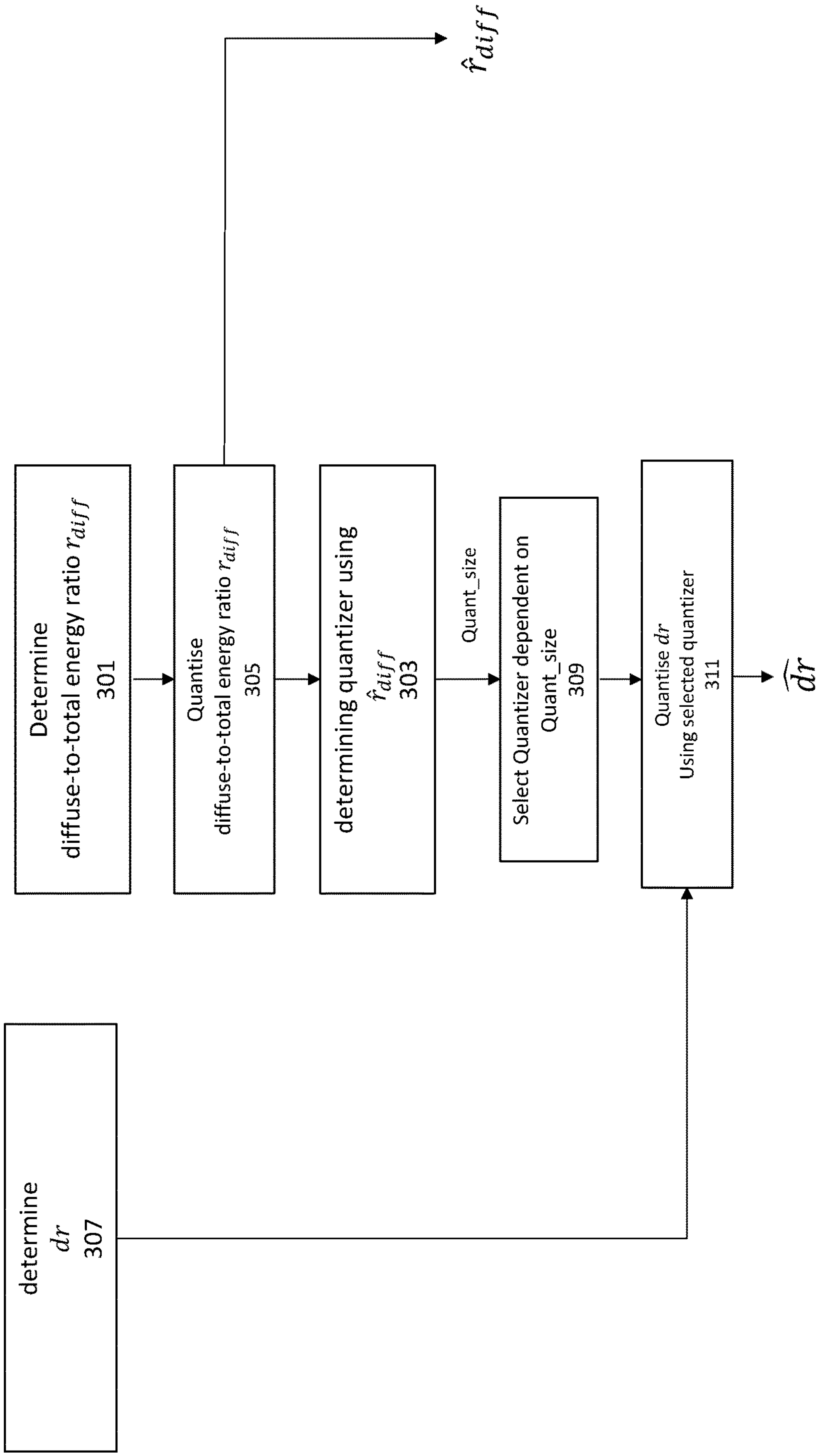
FIG. 3 shows a flow diagram of the operation of the metadata encoder as shown in FIG. 2 according to some embodiments.

The step of determining the diffuse-to-total energy ratio $r_{diff}$ (k, n) is shown as processing step 301 in FIG. 3.

The value of $r_{diff}$ (k, n) may then be scalar quantized to give $\hat{r}_{diff}$ (k, n). In embodiments this may be performed using a non-uniform scalar quantizer.

The step of quantizing $r_{diff}$ (k, n) is shown as processing step 305 in FIG. 3.

In some embodiments the value of diffuse-to-total energy ratio parameter $r_{diff}$ (k, n) can be used to determine the size of the quantizer to be used subsequently in the process. For instance, if $r_{diff}$ (k, n) is above a selection value then a first sized quantizer may be selected, however if $r_{diff}$ (k, n) is less that the selection value then a second sized quantizer may be selected. In embodiments this step may be written as If $r_{diff}$ (k, n)>$N_q$
 a. Quant_size=$Q_1$ (number of bits, value 1)
Else
 b. Quant_size=$Q_2$ (number of bits, value 2)
End if In other words if $r_{diff}$ (k, n)>$N_q$, (where $N_q$ is the selection value) then the quantizer size $Q_1$ is selected, otherwise quantizer size $Q_2$ is selected. $Q_1$ and $Q_2$ may express the quantizer size in terms of the number of bits.

In embodiments $N_q$ is found to lie between the values of 0 and 1. For instance one operating point for $N_q$ was found to be 0.6.

In a particular example of an embodiment the above step may have the following numerical values If $r_{diff}$ (k, n)>0.6
 a. Quant_size=2 (number of bits, value 1)
Else
 b. Quant_size=3 (number of bits, value 2)
End if In some embodiments the quantised diffuse-to-total energy ratio parameter r̂aiff (k, n) may be used in the above processing step. This can have the advantage that the quantizer size (Quant_size) is not required to be signalled as part of the bitstream. Instead, the quantizer size may be determined at the decoder by inspecting the value of $\hat{r}_{diff}$(k, n).

The step of determining the size of the quantizer using $\hat{r}_{diff}$ is shown as the processing step 303 in FIG. 3.

Embodiments may then determine the ratio of the first direct-to-total-energy ratio parameter to the sum of the first and second direct-to-total-energy ratio parameters, in other words a distribution factor of energy ratios This distribution factor of energy ratios may be expressed as $$dr(k, n) = \frac{r_1(k, n)}{r_1(k, n) + r_2(k, n)}$$

The step of determining the above ratio dr is depicted as the processing step 307 in FIG. 3.

For the case of three direct-to-total-energy ratio parameter per TF tile the diffuse-to-total energy ratio $r_{diff}$ (k, n) may be expressed as $$r_{diff}(k, n) = 1 - (r_1(k, n) + r_2(k, n) + r_3(k, n))$$

and the distribution factor of energy ratios may be given as $$dr_1(k, n) = \frac{r_1(k, n)}{r_1(k, n) + r_2(k, n) + r_3(k, n)}$$

and $$dr_2(k, n) = \frac{r_2(k, n)}{r_2(k, n) + r_3(k, n)}$$

Naturally, the above scheme can be extended to a general number of direct-to-total-energy ratio parameter per TF tile.

The value of the ratio dr(k, n) may now be quantized using a scalar quantizer. In embodiments one of a number of quantizers may be selected to quantize dr(k, n). As alluded to above, the quantizer used to quantize the ratio dr may be selected based on the results of the above processing step 303. In other words, the processing step 303 may be used to determine the size of the scalar quantizer used to quantize dr(k, n) to give $\widehat{dr}$(k,n).

The processing step of selecting the quantizer for quantizing dr(k, n) is shown as step 309 in FIG. 3.

In some embodiments dr(k, n) can be quantized using a quantizer selected from a number of uniform scalar quantizers. In the above example dr can be quantized to $\widehat{dr}$(k, n) using one of two uniform scalar quantizers as signified by Quant_size bits. Taking the above particular example of an embodiment either a 2 bit or 3 bit scalar quantizer may be used to quantize dr(k, n).

The processing step of quantizing dr(k, n) is shown as step 311 in FIG. 3.

The indices corresponding to the two quantized parameters $\widehat{dr}$(k, n) and $\hat{r}_{diff}$ (k, n) may be encoded using either a fixed or variable rate coding scheme.

Alternatively, the indices corresponding to the two quantized parameters $\widehat{dr}$(k,n) and $\hat{r}_{diff}$ (k, n) may be jointly encoded by forming a master index and then use entropy encoding (such as Golomb Rice or Huffman encoding) to encode the master index.

In some embodiments the above quantization of the direct-to-total energy ratio parameters may comprise an additional pre-processing step in which for each TF tile it is checked whether there are actually two direct-to-total energy ratios $r_1$ (k, n), $r_2$ (k, n) (associated with the first and second directions). The presence of a second direct-to-total energy ratio would indicate that the TF tile (k,n) has at least two concurrent directions.

If it is determined that the TF tile has two concurrent directions then spatial audio parameters associated with each of the two directions may be swapped if the direct-to-total energy ratio $r_1$ (k, n) of the first direction is less than the direct-to-total energy ratio $r_2$ (k, n) of the second direction. In embodiments the spatial audio parameters associated with a particular audio direction may comprise the parameters (from above Table 1); direction index, Direct-to-total energy ratio, spread coherence and distance. In other words, the pre-processing step may have the following form.

1. Check that for a TF tile that there are two concurrent directions, i.e. check for a second direct-to-total energy ratio, $r_2$ (k, n).
2. If concurrent directions are present, then check whether $r_1$ (k, n)<$r_2$ (k, n).
3. If $r_1$(k, n)<$r_2$ (k, n) then swap spatial audio parameters associated with the first direction with the spatial audio parameters associated with the second direction. This step therefore may comprise swapping at least one of the values of direction index, direct-to-total energy ratio $r_1$ (k, n), spread coherence ($\zeta_1$ (k, n) and distance associated with the first direction of the TF tile, with the values of direction index, Direct-to-total energy ratio $r_2$ (k, n), spread coherence $\zeta_2$ (k, n) and distance associated with the second direction of the TF tile.

The above procedure effectively orders the directions such that the direction with the larger direct-to-total energy ratio is always the first direction, and the direction with the smaller direct-to-total energy ratio is always the second direction.

The above pre-processing step can have the advantage of allowing more efficient quantizers, such that dr is always between 0.5 and 1 (in comparison to having the values between 0 and 1 in case the above swapping mechanism is not performed). Hence, the same accuracy may be obtained with roughly half the number of codewords.

Any further processing undertaken by the spatial parameter set encoder 207 may use the quantized direct-to-total energy ratios obtained from $\hat{r}_{diff}$ and $\widehat{dr}$.

The above quantization scheme has been described in the terms of energy ratios for a TF tile. However, it would be appreciated by the skilled person that the above could be equally applied to other parameters which quantify a signal, such as magnitude ratios, amplitude ratios and power ratios.

The metadata encoder/quantizer 111 may also comprise a direction encoder. The direction encoder is configured to receive direction parameters (such as the azimuth ¢ and elevation e) (and in some embodiments an expected bit allocation) and from this generate a suitable encoded output. In some embodiments the encoding is based on an arrangement of spheres forming a spherical grid arranged in rings on a 'surface' sphere which are defined by a look up table defined by the determined quantization resolution. In other words, the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

Similarly, the metadata encoder/quantizer 111 may also comprise a coherence encoder which is configured to receive the surround coherence values $\gamma$ and spread coherence values $\zeta$ and determine a suitable encoding for compressing the surround and spread coherence values.

The encoded direction, energy ratios and coherence values may be passed to a combiner. The combiner may be configured to receive the encoded (or quantized/compressed) directional parameters, energy ratio parameters and coherence parameters and combine these to generate a suitable output (for example a metadata bit stream which may be combined with the transport signal or be separately transmitted or stored from the transport signal).

In some embodiments the encoded datastream is passed to the decoder/demultiplexer 133. The decoder/demultiplexer 133 demultiplexes the encoded the quantized spatial audio parameter sets for the frame and passes them to the metadata extractor 137 and also the decoder/demultiplexer 133 may in some embodiments extract the transport audio signals to the transport extractor for decoding and extracting.

In embodiments the metadata extractor 137 may be arranged to extract the indices for $\widehat{dr}$ (k, n) and $\hat{r}_{diff}$ (k, n) for each TF tile.

The index associated with $\hat{r}_{diff}$ (k, n) can be read to give the corresponding quantized value.

The value of $\hat{r}_{diff}$ (k, n) may then be used to determine the particular quantizer (or quantisation table) (from a plurality of quantizers) which can be used at the decoder to dequantize the value of $\widehat{dr}$ (k, n). In other words, $\hat{r}_{diff}$ (k, n) is used to select the quantization table (from a plurality of quantization tables) at the decoder. The value of $\widehat{dr}$ (k, n) may then be read from the selected quantization table by using the index associated with $\widehat{dr}$ (k, n). The values of the direct-to-total energy ratios may then be determined by using the reverse process to that applied at the encoder. From the above example the quantized values of $r_1$ (k, n), $r_2$ (k, n) can be obtained as:

$$\hat{r}_1(k,n) = \widehat{dr}(k,n)(1-\hat{r}_{diff}(k,n)) \text{ and}$$

$$\hat{r}_2(k,n) = (1-\hat{r}_{diff}(k,n)) - \hat{r}_1(k,n)$$

The decoded spatial audio parameters may then form the decoded metadata output from the metadata extractor 137 and passed to the synthesis processor 139 in order to form the multi-channel signals 110.

Figure 4:
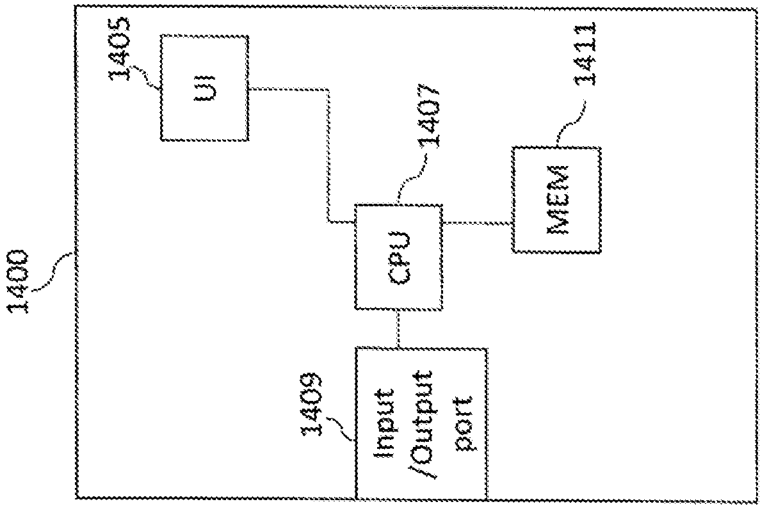
FIG. 4 shows schematically an example device suitable for implementing the apparatus shown.

With respect to FIG. 4 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor, cause the apparatus to:

receive, from a multi-channel microphone system, metadata associated with a time frequency tile of one or more audio signals, wherein the metadata comprises at least two or more direct-to-total energy ratios associated with the time frequency tile;

convert the two or more direct-to-total energy ratios to a diffuse-to-total energy ratio, wherein each respective one of the two or more direct-to-total energy ratios corresponds to a spatial audio direction and wherein each respective one of the two or more direct-to-total energy ratios indicates an amount of a total energy which is associated with its corresponding spatial audio direction;

quantize the diffuse-to-total energy ratio using a first quantizer;

determine a distribution factor of energy ratios dependent on a ratio of a first of the two or more direct-to-total energy ratios to the sum of the two or more direct-to-total energy ratios;

select a further quantizer from a plurality of further quantizers using the quantized diffuse-to-total energy ratio;

quantize the distribution factor of energy ratios using the selected further quantizer; and transmit or store an output comprised of an encoded audio transport signal and encoded metadata including the quantized distribution factor of energy ratios.

2. The apparatus as claimed in claim 1, wherein the diffuse-to-total energy ratio comprises one minus the sum of the two direct-to-total energy ratios.

3. The apparatus as claimed in claim 1, wherein the diffuse-to-total energy ratio is the sum of the two direct-to-total energy ratios.

4. The apparatus as claimed in claim 1, wherein the distribution factor of energy ratios comprises the ratio of the first of the two direct-to-total energy ratios to the sum of the two direct-to-total energy ratios.

5. The apparatus as claimed in claim 1, wherein the apparatus caused to select a further quantizer from a plurality of further quantizers using the quantized diffuse-to-total energy ratio is caused to:

compare the quantized diffuse-to-total energy ratio to a threshold value; and select the further quantizer from the plurality of further quantizers based on the comparison.

6. The apparatus as claimed in claim 1, wherein the first of the two direct-to-total energy ratios is associated with a first direction of a sound wave and a second of the two direct-to-total energy ratio is associated with a second direction of the sound wave, wherein the apparatus is further caused to:

determine that the second of the two direct-to-total energy ratios is greater than the first of the two direct-to-total energy ratios;

swap the first of the two direct-to-total energy ratios to be associated with the second direction; and swap the second of the two direct-to-total energy ratios to be associated with the first direction.

7. The apparatus as claimed in claim 6, wherein a first direction index, a first spread coherence and a first distance associated with the time frequency tile are each associated with the first direction of the sound wave, and wherein a second direction index, a second spread coherence and a second distance associated with the time frequency tile are each associated with the second direction of the sound wave, wherein it is determined that the second of the two direct-to-total energy ratios is greater than the first of the two direct-to-total energy ratios, the apparatus is further caused to at least one of the following:

swap the first direction index to be associated with the second direction and swap the second direction index to be associated with the first direction;

swap the first distance to be associated with the second direction and swap the second distance to be associated with the first direction; and swap the first spread coherence to be associated with the second direction and swap the second spread coherence to be associated with the first direction.

8. A method for spatial audio encoding comprising:

receiving from a multi-channel microphone system, metadata associated with a time frequency tile of one or more audio signals, wherein the metadata comprises at least two or more direct-to-total energy ratios associated with the time frequency tile;

converting the two or more direct-to-total energy ratios to a diffuse-to-total energy ratio, wherein each respective one of the two or more direct-to-total energy ratios corresponds to a spatial audio direction and wherein each respective one of the two or more direct-to-total energy ratios indicates an amount of a total energy which is associated with its corresponding spatial audio direction;

quantizing the diffuse-to-total energy ratio using a first quantizer;

determining a distribution factor of energy ratios dependent on a ratio of a first of the two or more direct-to-total energy ratios to the sum of the two or more direct-to-total energy ratios;

selecting a further quantizer from a plurality of further quantizers using the quantized diffuse-to-total energy ratio;

quantizing the distribution factor of energy ratios using the selected further quantizer; and transmitting or storing an output comprised of an encoded transport signal and encoded metadata including the quantized distribution factor of energy ratios.

9. The method as claimed in claim 8, wherein the diffuse-to-total energy ratio comprises one minus the sum of the two direct-to-total energy ratios.

10. The method as claimed in claim 8, wherein the diffuse-to-total energy ratio is the sum of the two direct-to-total energy ratios.

11. The method as claimed in claim 8, wherein the distribution factor of energy ratios comprises the ratio of the first of the two direct-to-total energy ratios to the sum of the two direct-to-total energy ratios.

12. The method as claimed in claim 8, wherein selecting a further quantizer from a plurality of further quantizers using the quantized diffuse-to-total energy ratio comprises:

comparing the quantized diffuse-to-total energy ratio to a threshold value; and selecting the further quantizer from the plurality of further quantizers based on the comparison.

13. The method as claimed in claim 8, wherein the first of the two direct-to-total energy ratios is associated with a first direction of a sound wave and a second of the two direct-to-total energy ratio is associated with a second direction of the sound wave, wherein the method further comprises the preceding processing steps of:

determining that the second of the two direct-to-total energy ratios is greater than the first of the two direct-to-total energy ratios;

swapping the first of the two direct-to-total energy ratios to be associated with the second direction; and swapping the second of the two direct-to-total energy ratios to be associated with the first direction.

14. The method as claimed in claim 13, wherein a first direction index, a first spread coherence and a first distance associated with the time frequency tile are each associated with the first direction of the sound wave, and wherein a second direction index, a second spread coherence and a second distance associated with the time frequency tile are each associated with the second direction of the sound wave, wherein it is determined that the second of the two direct-to-total energy ratios is greater than the first of the two direct-to-total energy ratios, the method further comprises at least one of the following:

swapping the first direction index to be associated with the second direction and swapping the second direction index to be associated with the first direction;

swapping the first distance to be associated with the second direction and swapping the second distance to be associated with the first direction; and swapping the first spread coherence to be associated with the second direction and swapping the second spread coherence to be associated with the first direction.

* * * * *